US009964278B2

(12) United States Patent
Matsumoto et al.

(10) Patent No.: US 9,964,278 B2

(45) Date of Patent: May 8, 2018

(54) VEHICLE LAMP

(71) Applicant: Koito Manufacturing Co., Ltd., Tokyo (JP)

(72) Inventors: Masakazu Matsumoto, Shizuoka (JP); Takayuki Suzuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 10 days.

(21) Appl. No.: 15/178,766

(22) Filed: Jun. 10, 2016

(65) Prior Publication Data

US 2016/0377253 A1 Dec. 29, 2016

(30) Foreign Application Priority Data

Jun. 24, 2015 (JP) ................................ 2015-127086

(51) Int. Cl.

*F21V 1/00* (2006.01)
*F21S 8/10* (2006.01)

(Continued)

(52) U.S. Cl.

CPC .............. *F21S 48/234* (2013.01); *B60Q 1/30* (2013.01); *F21S 48/211* (2013.01); *F21V 7/048* (2013.01)

(58) Field of Classification Search

CPC ........ B60Q 1/30; F21S 48/13; F21S 48/1376; F21S 48/23; F21S 48/234; F21V 7/048

See application file for complete search history.

(56) References Cited

U.S. PATENT DOCUMENTS 1,394,319 A * 10/1921 McNeal .............. F21S 48/1376 362/348

D343,916 S * 2/1994 King .............................. D26/35

(Continued)

FOREIGN PATENT DOCUMENTS

CN 2658557 Y 11/2014
JP 10-154404 A 6/1998

(Continued)

OTHER PUBLICATIONS

An Office Action dated Jun. 15, 2017, issued from the Korean Intellectual Property Office (KIPO), of Korean Patent Application No. 10-2016-0075516 and an English translation thereof.

(Continued)

*Primary Examiner* — Alexander Garlen

(74) *Attorney, Agent, or Firm* — Abelman, Frayne & Schwab

(57) ABSTRACT

A reflecting surface of a reflector has a structure where a plurality of reflecting elements are arranged in rows in an up-and-down direction, and the reflecting elements are arranged as a plurality of sets in a left-and-right direction. The surface of each reflecting element is composed of a curved surface having a horizontal section curvature larger than a vertical section curvature. Thus, a horizontally long light distribution pattern may be easily formed by light reflecting from each reflecting element. Each reflecting element is connected to each of four reflecting elements which are adjacent thereto in the left-and-right direction and are shifted therefrom in the up-and-down direction, through a boundary line extending from a vertical plane in an inclined direction in the left-and-right direction. Thus, the horizontally long light distribution pattern formed by the light reflecting from each reflecting element becomes a bright light distribution pattern having four chipped corners.

10 Claims, 8 Drawing Sheets

(51) Int. Cl.
*B60Q 1/30* (2006.01)
*F21V 7/04* (2006.01)

(56) References Cited

U.S. PATENT DOCUMENTS

| | | | | | |
|---|---|---|---|---|---|
| 5,980,067 | A * | 11/1999 | Albou | F21S 48/137 | 362/303 |
| 2008/0316761 | A1 * | 12/2008 | Minano | G02B 3/0068 | 362/518 |
| 2013/0094209 | A1 * | 4/2013 | Yu | B60Q 1/2611 | 362/236 |
| 2014/0133161 | A1 * | 5/2014 | Tang | B29D 11/00596 | 362/348 |
| 2016/0186951 | A1 * | 6/2016 | Zheng | F21S 48/215 | 362/509 |
| 2016/0305631 | A1 * | 10/2016 | Hansen | F21S 10/06 | |

FOREIGN PATENT DOCUMENTS

| | | | |
|---|---|---|---|
| JP | 2003-255242 | A | 9/2003 |
| JP | 3963454 | B | 8/2007 |
| JP | 2014-232648 | A | 12/2014 |
| KR | 10-2003-0015865 | A | 2/2003 |

OTHER PUBLICATIONS

An Office Action dated Dec. 13, 2017, issued from the Korean Intellectual Property Office (KIPO), of Korean Patent Application No. 10-2016-0075516 and an English translation thereof (9 pages).

* cited by examiner

VEHICLE LAMP

CROSS-REFERENCE TO RELATED APPLICATIONS

This application is based on and claims priority from Japanese Patent Application No. 2015-127086, filed on Jun. 24, 2015, with the Japan Patent Office, the disclosure of which is incorporated herein in its entirety by reference.

TECHNICAL FIELD

The disclosure relates to a vehicle lamp including a light emitting element and a reflector.

BACKGROUND

Conventionally, a vehicle lamp structure has been known that includes a light source and a reflector configured to reflect light from the light source.

Japanese Patent Laid-Open Publication No. 10-154404 discloses a structure of a reflector in such a vehicle lamp in which a reflecting surface is vertically divided into a plurality of regions, and a plurality of reflecting elements are arranged on the regions, respectively.

SUMMARY

A light distribution pattern to be formed by light irradiated from a vehicle lamp is often a horizontally long light distribution pattern. Here, a certain type of a lamp does not require brightness in the regions located at upper and lower ends of the left and right end portions of a light distribution pattern so much even though the light distribution pattern is a horizontally long light distribution pattern.

In such a case, forming a light distribution pattern having four chipped corners is more desirable than forming a horizontally long rectangular light distribution pattern because the brightness of a portion to be originally irradiated is capable of being increased.

However, in the above-described conventional vehicle lamp, since each reflecting element has a rectangular outer shape, it is difficult to form a horizontally long light distribution pattern with four chipped corners although it is relatively easy to form a horizontally long rectangular light distribution pattern.

The present disclosure has been made in view such circumstances, and is to provide a vehicle lamp including a light emitting element and a reflector, by which a horizontally long light distribution pattern having four chipped corners may be formed as a bright light distribution pattern.

The present disclosure arranges a plurality of reflecting elements in order to achieve the above described purposes.

That is, the vehicle lamp according to the present disclosure includes a light emitting element and a reflector configured to reflect light from the light emitting element forward. A reflecting surface of the reflector has a structure in which a plurality of reflecting elements are arranged in rows in an up-and-down direction, and the plurality of reflecting elements arranged in rows are arranged as a plurality of sets in a left-and-right direction. The plurality of reflecting elements are arranged to be shifted from each other in the up-and-down direction in adjacent respective sets. Each of the reflecting elements is connected to at least one reflecting element which is adjacent thereto in the left-and-right direction, and is shifted therefrom in the up-and-down direction, through a boundary line extending from a vertical plane in an inclined direction in a left-and-right direction. A surface of each of the reflecting elements is composed of a curved surface which has a curvature of a horizontal section larger than a curvature of a vertical section.

The type of the "vehicle lamp" is not particularly limited, and for example, a rear fog lamp or a daytime running lamp may be employed.

The type of the "light emitting element" is not particularly limited, and for example, a light emitting diode or a laser diode may be employed.

The "plurality of reflecting elements" are arranged to be shifted from each other in the up-and-down direction in adjacent respective sets, but a specific size of the vertical displacement is not particularly limited.

As long as the "boundary line" described above extends from a vertical plane in an inclined direction in the left-and-right direction (that is, a direction located between a vertical direction and a horizontal direction), its specific inclination angle and length are not particularly limited. The "boundary line" may extend in a straight line, or a curved line.

As long as the "surface of each reflecting element" is composed of a curved surface which has a curvature of a horizontal section larger than a curvature of a vertical section, its specific shape is not particularly limited. Also, the "surface of each reflecting element" may be formed into a convex surface shape, or a concave surface shape.

In the vehicle lamp according to the present disclosure, a reflecting surface of the reflector has a structure in which a plurality of reflecting elements are arranged in rows in the up-and-down direction, and the plurality of reflecting elements arranged in rows are arranged as a plurality of sets in the left-and-right direction, but a surface of each of the reflecting elements is composed of a curved surface which has a curvature of a horizontal section larger than a curvature of a vertical section. Thus, it becomes possible to easily form a horizontally long light distribution pattern by light reflecting from each reflecting element.

Here, each reflecting element is connected to at least one reflecting element which is adjacent thereto in the left-and-right direction and shifted therefrom in the up-and-down direction, through a boundary line extending from a vertical plane in an inclined direction in the left-and-right direction. Thus, a horizontally long light distribution pattern formed by the light reflecting from each reflecting element may be a light distribution pattern having four chipped corners.

Then, reflecting areas that have conventionally been used for forming the four chipped corner portions may be utilized as a part of the plurality of reflecting elements. Thus, the light distribution pattern may be brightened by the chipped amount of the four corners.

As described above, according to the present disclosure, in the vehicle lamp including a light emitting element and a reflector, a horizontally long light distribution pattern having four chipped corners may be formed as a bright light distribution pattern.

In the structure as described above, when the plurality of reflecting elements are arranged to be shifted from each other by a half pitch in the up-and-down direction and/or in the left-and-right direction in respective sets, the plurality of reflecting elements may be arranged with no gaps in the respective sets. Thus, the horizontally long light distribution pattern having four chipped corners may be efficiently formed.

In the structure as described above, when each reflecting element has an outer shape having a greater up-and-down width than a left-and-right width, the following operational effects may be achieved.

That is, since the surface of each reflecting element is composed of a curved surface which has a curvature of a horizontal section larger than a curvature of a vertical section as described above, it becomes possible to easily align the position of the outer periphery of each reflecting element with respect to the thickness direction of the reflector by setting an up-and-down width to be larger than a left-and-right width in the outer shape of each reflecting element. Accordingly, the thickness of the reflector may be suppressed from becoming unintentionally thick.

In the structure as described above, when the reflector is disposed below the light emitting element, and the light emitting element is disposed such that the light emitting surface faces downwards, the following operational effects may be achieved.

That is, when the light emitting element is disposed such that the light emitting surface faces downwards, the light emitting element and its support structure may be hardly seen from outside of the lamp, and also it becomes possible to easily secure the heat dissipation function of the light emitting element.

In the structure as described above, when a plurality of sets of light emitting elements and reflectors are arranged, the horizontally long light distribution pattern having four chipped corners may be formed as a brighter light distribution pattern with a more uniform brightness.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, an exemplary embodiment of the present disclosure will be described with reference to drawings.

Figure 1:
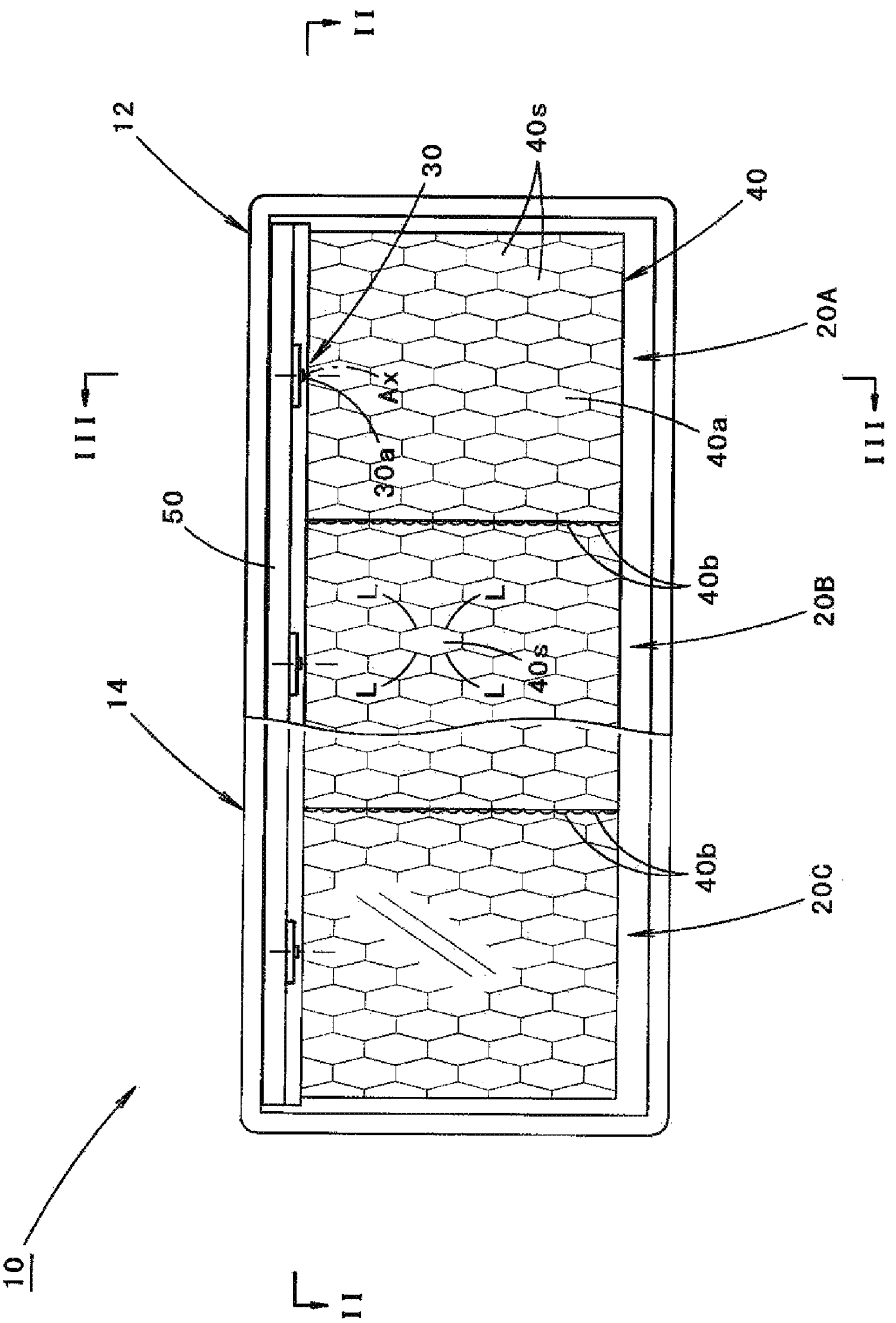
FIG. 1 is a front view illustrating a vehicle lamp according to an exemplary embodiment of the present disclosure.
Figure 2:
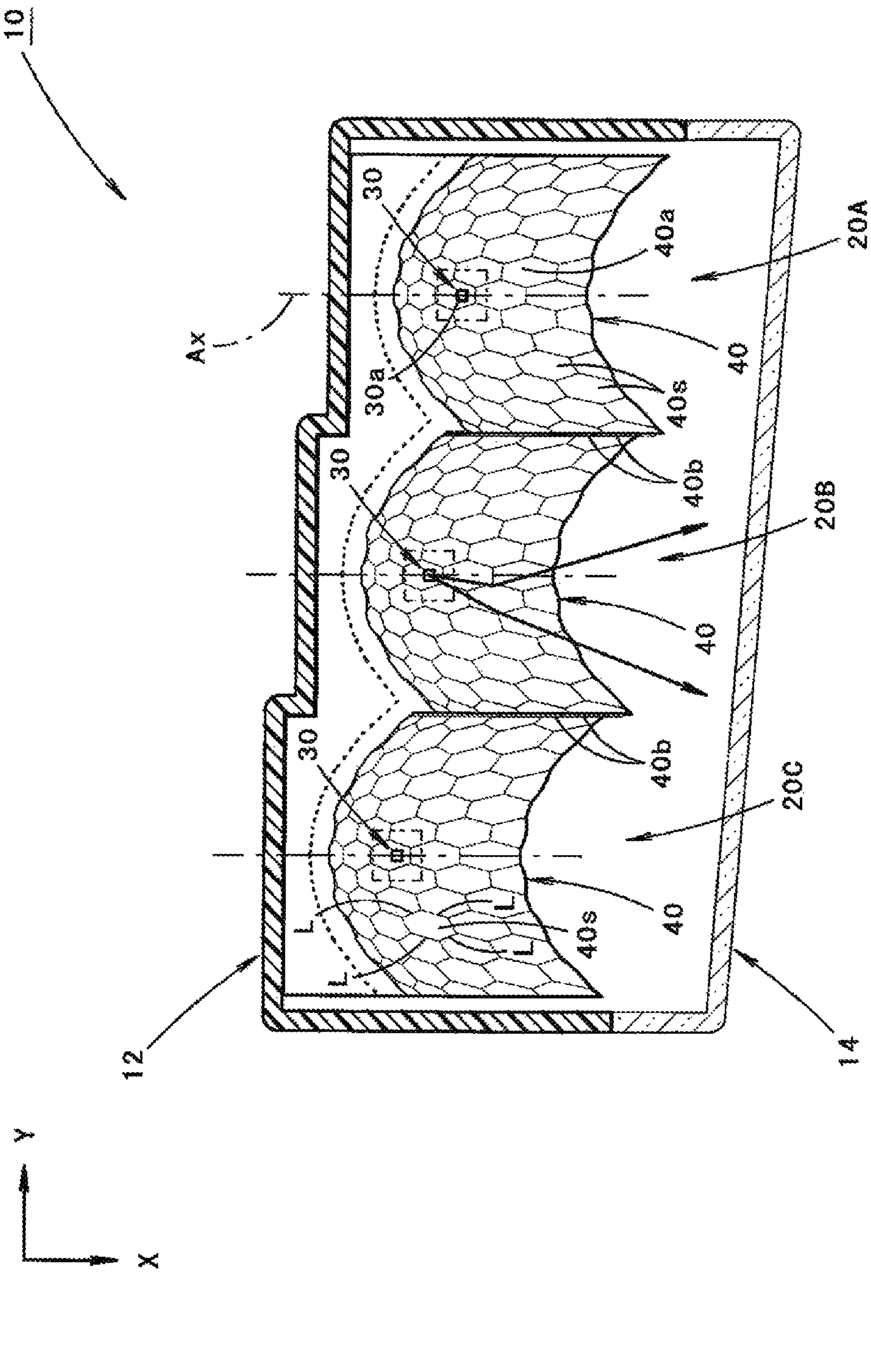
FIG. 2 is a sectional view taken along line II-II of FIG. 1.
Figure 3:
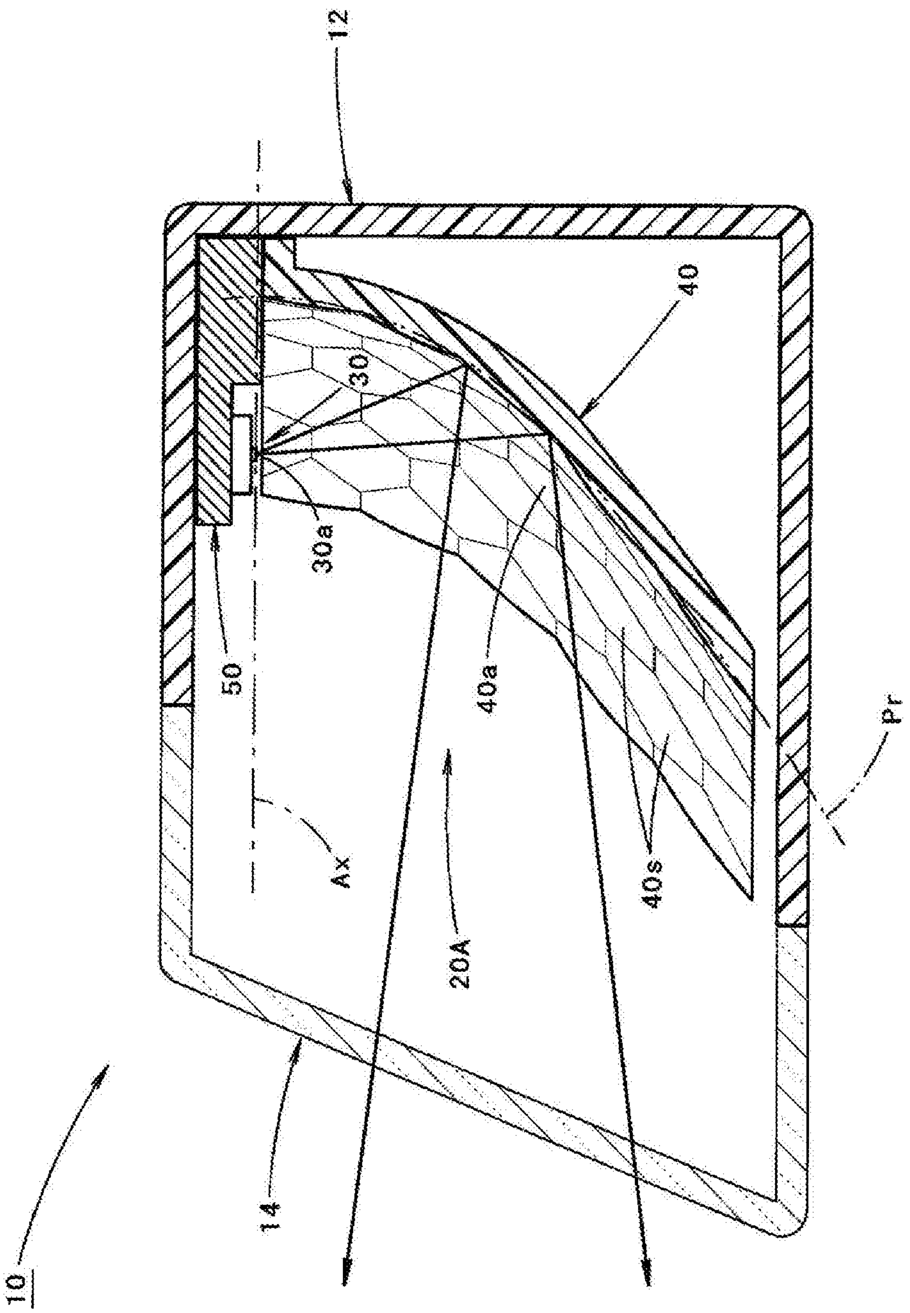
FIG. 3 is a sectional view taken along line of FIG. 1.

FIG. 1 is a front view illustrating a vehicle lamp 10 according to an exemplary embodiment of the present disclosure. FIG. 2 is a sectional view taken along line II-II of FIG. 1, and FIG. 3 is a sectional view taken along line of FIG. 1.

As illustrated in these drawings, the vehicle lamp 10 according to the present exemplary embodiment is a rear fog lamp arranged at the left rear end of a vehicle.

In the case of the vehicle lamp 10, in FIG. 2, a direction indicated by X is "forward" ("backward" in the vehicle), and a direction indicated by Y is "rightward" perpendicular to "forward" (also, "rightward" in the vehicle).

The vehicle lamp 10 has a structure in which three lamp units 20A, 20B, and 20C are provided within a lamp chamber formed by a lamp body 12 and a transparent translucent cover 14 attached to the front end opening of the lamp body 12.

The three lamp units 20A, 20B, and 20C are arranged in parallel in the vehicle width direction, and a lamp unit located at the outer side in the vehicle width direction is arranged in the state of being displaced backward.

Each of the lamp units 20A, 20B, and 20C is configured as a reflector unit including a light emitting element 30 and a reflector 40, and is supported by a common support member 50.

The support member 50 has a structure in which a printed circuit board (not illustrated) is formed on the surface of a platy resin member, and the light emitting element 30 of each of the lamp units 20A, 20B, and 20C is mounted on the printed circuit board.

The lamp units 20A, 20B, and 20C have the same basic structures, but the reflectors 40 of the lamp units 20A, 20B, and 20C have partially different structures.

That is, the reflectors 40 of the lamp units 20A, 20B, and 20C are integrally formed, and here, in the reflector 40 of each of the lamp units 20B and 20C displaced backward with respect to the lamp units 20A and 20B, respectively, on the surface of the right wall formed as a step, a plurality of diffusion reflecting elements 40$b$ extending in the front-and-rear direction are formed to be aligned in the up-and-down direction.

As described above, since the lamp units 20A, 20B, and 20C have the same basic structures, the structure of the lamp unit 20A located at the right end will be described below.

The light emitting element 30 is a red light emitting diode having a rectangular (e.g., a square shape of 1 mm×1 mm) light emitting surface 30$a$, and is arranged in a state where the light emitting surface 30$a$ faces downwards on the optical axis Ax extending in the front-and-rear direction of the lamp. Here, the light emitting element 30 is arranged in a state where the left and right edges of the light emitting surface 30$a$ extend in the front-and-rear direction of the vehicle.

The reflector 40 includes a reflecting surface 40$a$ of a parabolic system.

That is, the reflecting surface 40$a$ includes a plurality of reflecting elements 40$s$ formed using a rotary paraboloid face Pr, which is centered on the optical axis Ax as a center axis (see, e.g., FIG. 3), as a reference plane. Then, light emitted from the light emitting element 30 is reflected forward and controlled by the plurality of reflecting elements 40*s*. Here, each of the reflecting elements 40*s* is adapted to diffuse the light emitted from the light emitting element 30 at a relatively large diffusion angle in the left-and-right direction and at a relatively small diffusion angle in the up-and-down direction.

The reflecting surface 40*a* has a substantially rectangular outer shape in a front view of the lamp, and the position of the upper edge of the reflecting surface 40*a* is set to have substantially the same height as the optical axis Ax.

Hereinafter, a specific structure of the reflecting surface 40*a* of the reflector 40 will be described.

As illustrated in FIG. 1, the reflecting surface 40*a* has a structure in which the plurality of reflecting elements 40*s* are arranged in rows in the up-and-down direction, and the plurality of reflecting elements 40*s* arranged in rows are arranged as a plurality of sets in the left-and-right direction.

The plurality of reflecting elements 40*s* are arranged to be shifted from each other in the up-and-down direction in adjacent respective sets. Then, each reflecting element 40*s* is connected to each of four reflecting elements 40*s* which are adjacent thereto in the left-and-right direction and are shifted therefrom in the up-and-down direction, through boundary lines L each extending from a vertical plane in an inclined direction in the left-and-right direction.

Each reflecting element 40*s*, in a front view of the lamp, has a vertically long hexagonal outer shape (i.e., an outer shape having a greater up-and-down width than a left-and-right width). Here, the respective reflecting elements 40*s*, in a front view of the lamp, have the same outer shapes.

Figure 4A:
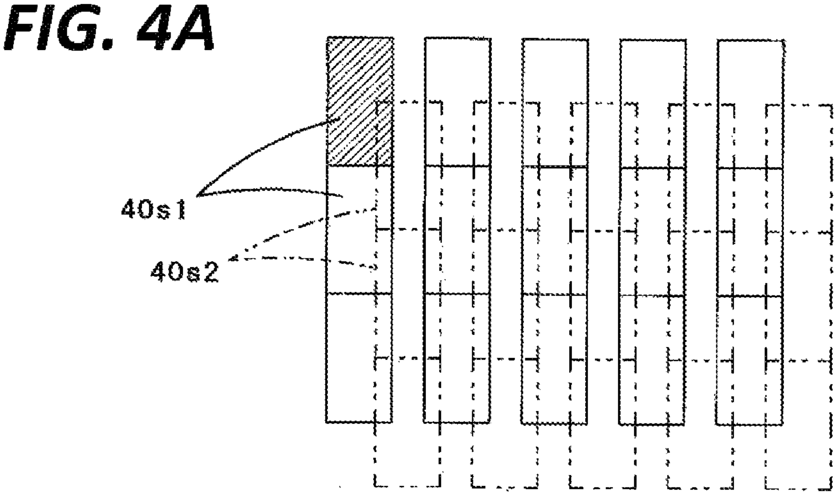
FIGS. 4A to 4C are front views for explaining the establishment of a reflecting surface of a reflector in the vehicle lamp.
Figure 4B:
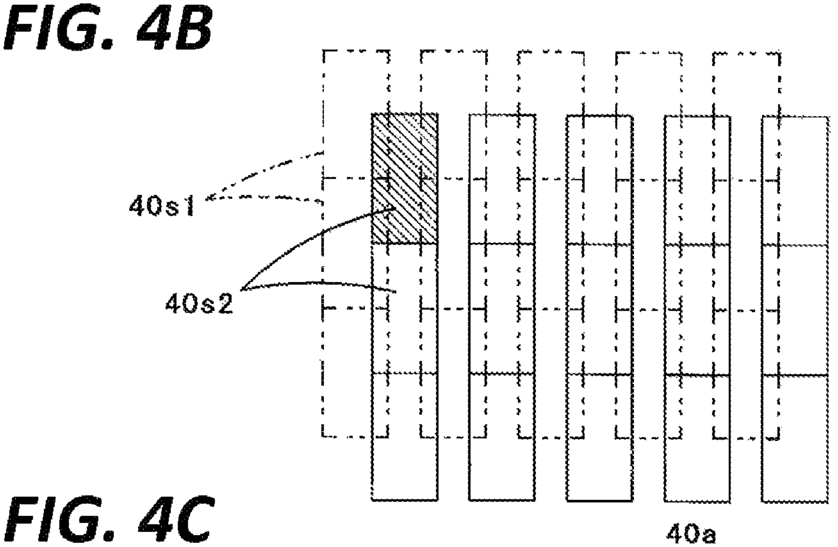
Figure 4C:
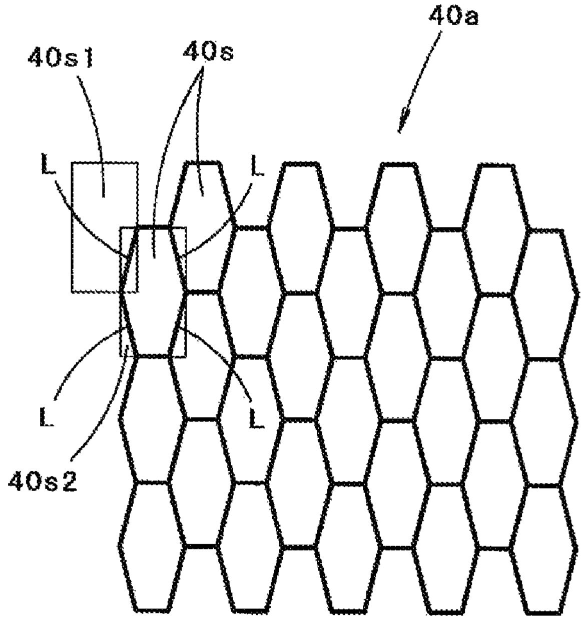

FIGS. 4A to 4C are front views for explaining an establishment of the reflecting surface 40*a* of the reflector 40.

As illustrated in FIG. 4C, the plurality of reflecting elements 40*s* that constitute the reflecting surface 40*a* are formed by superposition of a plurality of reflecting elements 40*s*1 illustrated in FIG. 4A, and a plurality of reflecting elements 40*s*2 illustrated in FIG. 4B.

As illustrated in FIG. 4A, the plurality of reflecting elements 40*s*1, in a front view of the lamp, has a structure where the plurality of reflecting elements 40*s*1 each having a vertically long rectangular shape (e.g., a rectangle with an aspect ratio of 2:1) are continuously arranged in rows in the up-and-down direction, and the plurality of reflecting elements 40*s*1 arranged in rows are arranged as a plurality of sets at equal pitches at certain intervals in the left-and-right direction.

Meanwhile, as illustrated in FIG. 4B, the plurality of reflecting elements 40*s*2, in a front view of the lamp, has a structure where the plurality of reflecting elements 40*s*2 having the same outer shapes as the reflecting elements 40*s*1 are continuously arranged in rows in the up-and-down direction, and the plurality of reflecting elements 40*s*2 arranged in rows are arranged as a plurality of sets at equal pitches at certain intervals in the left-and-right direction.

Here, each of the reflecting elements 40*s*2 is arranged to be shifted from each of the reflecting elements 40*s*1 by a half pitch in the up-and-down direction. In the left-and-right direction, the reflecting elements 40*s*2 are arranged to be located at the center of the reflecting elements 40*s*1 of two sets of rows which are adjacent to each other.

Accordingly, as illustrated in FIG. 4C, the reflecting surface 40*a* has a surface shape on which the respective reflecting elements 40*s*1 overlap the respective reflecting elements 40*s*2 by half in the up-and-down direction, and slightly overlap the respective reflecting elements 40*s*2 (e.g., by about ¼) in the left-and-right direction.

Then, as lines of intersection between the respective reflecting elements 40*s*1 and the respective reflecting elements 40*s*2, boundary lines L extending from a vertical plane in inclined directions in the left-and-right direction are formed at four locations. Here, since the degree of overlapping in the left-and-right direction between each of the reflecting elements 40*s*1 and each of the reflecting elements 40*s*2 is small, the inclination angle of each boundary line L from the vertical plane becomes relatively small.

Accordingly, each reflecting element 40*s*, in a front view of the lamp, has a vertically long hexagonal outer shape surrounded by the four boundary lines L and a pair of upper and lower sides (i.e., an outer shape obtained by omitting four corners of each reflecting element 40*s*2).

Figure 5B:
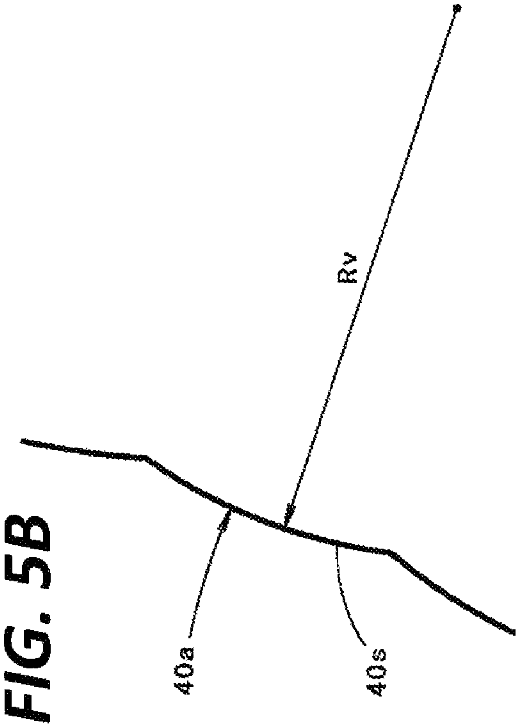
FIG. 5B is a sectional view taken along line B-B of FIG. 5A.
Figure 5A:
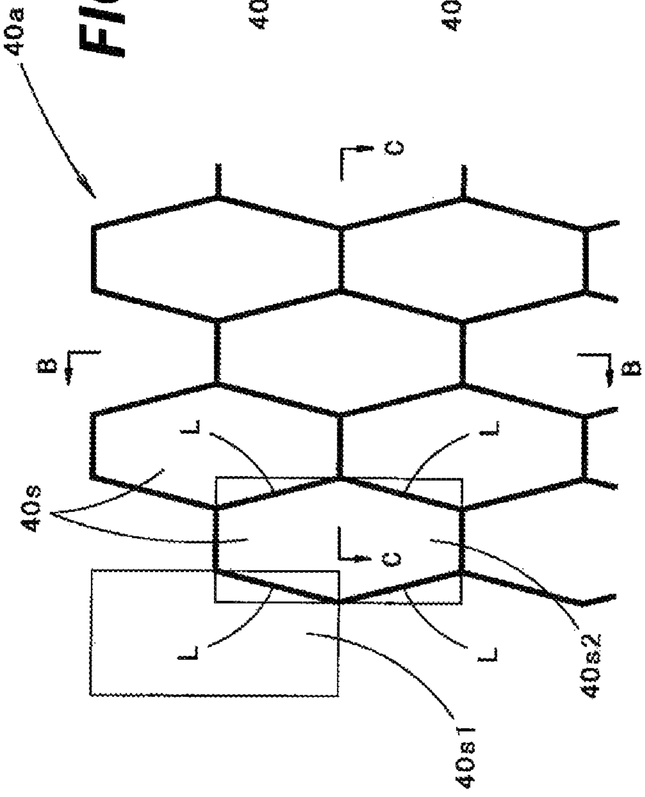
FIG. 5A is a view illustrating a main portion of FIG. 4C in an enlarged scale.
Figure 5C:
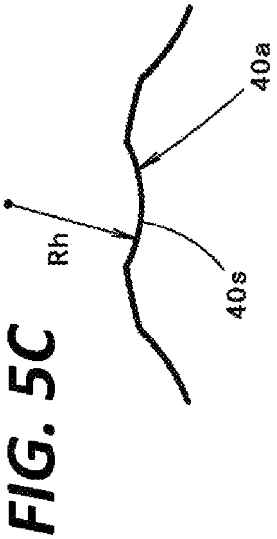
FIG. 5C is a sectional view taken along line C-C of FIG. 5A.

FIG. 5A is a view illustrating a main portion of FIG. 4C in an enlarged scale, FIG. 5B is a sectional view taken along line B-B of FIG. 5A, and FIG. 5C is a sectional view taken along line C-C of FIG. 5A.

As illustrated in these drawings, each reflecting element 40*s* has a surface constituted by a convex curved surface. Here, the radius of curvature Rv of the vertical section of the convex curved surface is set to a value larger than the radius of curvature Rh of the horizontal section. That is, the surface of each reflecting element 40*s* is composed of a curved surface which has a curvature of a horizontal section larger than a curvature of a vertical section.

Figure 6B:
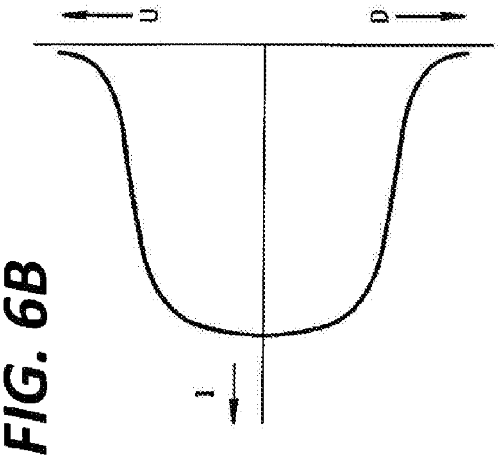
FIG. 6B is a view illustrating a light intensity distribution according to line V-V of the light distribution pattern.
Figure 6A:
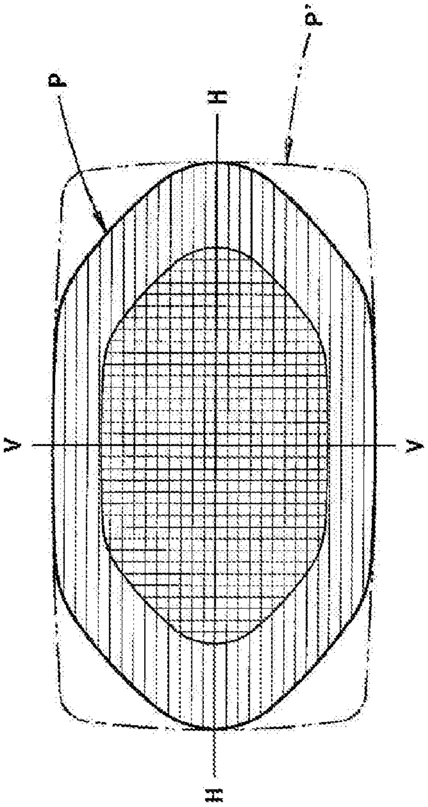
FIG. 6A is a view illustrating a light distribution pattern formed on a virtual vertical screen arranged in front of the lamp by light irradiated from the vehicle lamp.

FIG. 6A is a view illustrating a light distribution pattern P formed on a virtual vertical screen arranged in front of the lamp by light irradiated from the vehicle lamp 10.

Such a light distribution pattern P is formed as a horizontally long light distribution pattern which spreads on the left and right sides with respect to the line V-V vertically passing through H-V that is a vanishing point in the forward direction of the lamp.

The formation of the light distribution pattern P as a horizontally long light distribution pattern is caused by that the surface of each reflecting element 40*s* is composed of a curved surface which has a curvature of a horizontal section larger than a curvature of a vertical section, and thus the light emitted from the light emitting element 30 is diffused in a relatively large diffusion angle in the left-and-right direction, and is diffused in a relatively small diffusion angle in the up-and-down direction in each reflecting element 40*s*.

The light distribution pattern P is a horizontally long light distribution pattern, but has four chipped corners.

This is because each reflecting element 40*s* has a vertically long hexagonal outer shape, and reflecting areas at four corners for irradiating portions of four corners in the horizontally long rectangular light distribution pattern are chipped.

A horizontally long rectangular light distribution pattern P' indicated by a two-dot chain line in FIG. 6A is a light distribution pattern formed in the case where each reflecting element 40*s* has a vertically long rectangular outer shape as in the prior art.

The light distribution pattern P is a light distribution pattern in which four corners of the light distribution pattern P' are chipped. Reflecting areas which have conventionally been used for forming such four chipped corner portions are used as a part of the plurality of reflecting elements 40*s*, and thus the light distribution pattern P becomes a brighter light distribution pattern than the light distribution pattern P'.

Figure 6C:
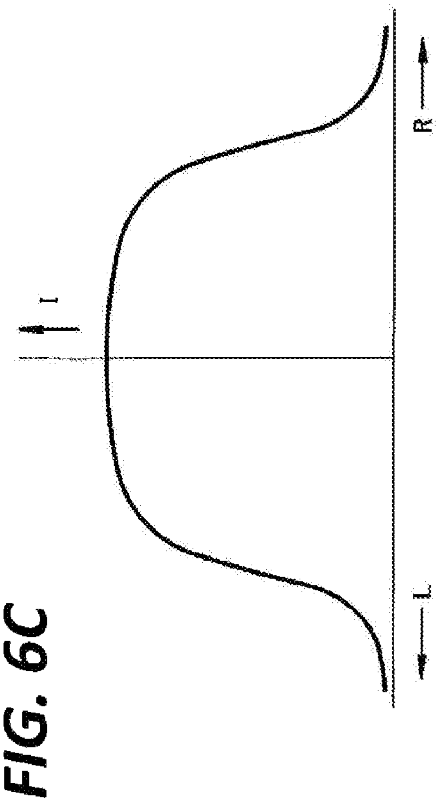
FIG. 6C is a view illustrating a light intensity distribution according to line H-H of the light distribution pattern.

FIG. 6B is a view illustrating a light intensity distribution according to line V-V of the light distribution pattern P, and FIG. 6C is a view illustrating a light intensity distribution according to line H-H.

As illustrated in these drawings, the light intensity I of the light distribution pattern P has a substantially constant and high value at a relatively small angular range at upper and lower sides around H-V and at a relatively large angular range at left and right sides. Therefore, the light distribution pattern P is suitable for a light distribution pattern of a rear fog lamp for arousing attention to, for example, a following vehicle.

Next, the operational effects of the present exemplary embodiment will be described.

In the vehicle lamp 10 according to the present exemplary embodiment, the reflecting surface 40*a* of the reflector 40 has a structure in which the plurality of reflecting elements 40*s* are arranged in rows in the up-and-down direction, and the plurality of reflecting elements 40*s* arranged in rows are arranged as a plurality of sets in the left-and-right direction. The surface of each reflecting element 40*s* is composed of a curved surface which has a curvature of a horizontal section larger than a curvature of a vertical section, and thus, it becomes possible to easily form a horizontally long light distribution pattern P by light reflecting from each reflecting element 40*s*.

Here, each reflecting element 40*s* is connected to each of four reflecting elements 40*s* which are adjacent to the corresponding reflecting element 40*s* in the left-and-right direction and are shifted from the corresponding reflecting element 40*s* in the up-and-down direction, through a boundary line L extending from a vertical plane in an inclined direction in the left-and-right direction. Thus, the horizontally long light distribution pattern P formed by the light reflecting from each reflecting element 40*s* may be a light distribution pattern having four chipped corners.

Then, reflecting areas that have conventionally been used for forming the four chipped corner portions may be utilized as a part of the plurality of reflecting elements 40*s*. Thus, the light distribution pattern P may be brightened by the chipped amount of the four corners.

As described above, according to the present exemplary embodiment, in the vehicle lamp 10 including the light emitting element 30 and the reflector 40, the horizontally long light distribution pattern P having four chipped corners may be formed as a bright light distribution pattern.

Here, in the present exemplary embodiment, the plurality of reflecting elements 40*s* are arranged to be shifted from each other by a half pitch in the up-and-down direction in respective sets, and thus the plurality of reflecting elements 40*s* may be arranged with no gaps in the respective sets. Accordingly, the horizontally long light distribution pattern P having four chipped corners may be efficiently formed.

Further, since each reflecting element 40*s* has an outer shape having a greater up-and-down width than a left-and-right width, the following operational effects may be achieved.

That is, the surface of each reflecting element 40*s* is composed of a curved surface which has a curvature of a horizontal section larger than a curvature of a vertical section as described above. Thus, by setting an up-and-down width to be larger than a left-and-right width in the outer shape of each reflecting element 40*s*, it becomes possible to easily align the position of the outer periphery of each reflecting element 40*s* with respect to the thickness direction of the reflector 40. Accordingly, the thickness of the reflector 40 may be suppressed from becoming unintentionally thick.

Also, in the present exemplary embodiment, the reflector 40 is disposed below the light emitting element 30, and the light emitting element 30 is disposed such that the light emitting surface 30*a* faces downwards. Thus, the following operational effects may be achieved.

That is, since the light emitting element 30 is disposed such that the light emitting surface 30*a* faces downwards, the light emitting element 30 and the support member 50 may be hardly seen from outside of the lamp, and also it may be possible to easily secure the heat dissipation function of the light emitting element 30.

Further, since the vehicle lamp 10 according to the present exemplary embodiment includes three lamp units 20A, 20B, and 20C, a light distribution pattern P may be formed as a synthetic light distribution pattern of light distribution patterns formed by lights irradiated from the respective lamp units 20A, 20B, and 20C. Accordingly, the horizontally long light distribution pattern P having four chipped corners may be formed as a brighter light distribution pattern with a more uniform brightness.

Also, in the present exemplary embodiment, in the reflector 40 of each of the lamp units 20B and 20C displaced backward with respect to the lamp units 20A and 20B, respectively, on the surface of the right wall, a plurality of diffusion reflecting elements 40*b* extending in the front-and-rear direction are formed to be aligned in the up-and-down direction. Thus, the light emitting from the light emitting element 30, which reaches the right wall surface of each reflector 40, may be reflected as light diffused in the up-and-down direction. Thus, it is possible to effectively suppress a light accumulation from being unintentionally formed around the light distribution pattern P.

Also, in the exemplary embodiment described above, it has been described that three lamp units 20A, 20B, and 20C are provided, but another structure including four or more lamp units or two or less lamp units may be employed.

Also, in the exemplary embodiment described above, it has been described that three lamp units 20A, 20B, and 20C have the same structures. However, in the respective lamp units 20A, 20B, and 20C, reflecting elements 40*s* each constituting the reflecting surface 40*a* of the reflector 40 may be different in a surface shape or an outer shape.

In the exemplary embodiment described above, it has been described that over the entire area of the reflecting surface 40*a* of the reflector 40, each reflecting element 40*s* is connected to each of four reflecting elements 40*s* which are adjacent to the corresponding reflecting element 40*s* in the left-and-right direction and are shifted from the corresponding reflecting element 40*s* in the up-and-down direction, through a boundary line L extending from a vertical plane in an inclined direction in the left-and-right direction. However, even in the case where this structure is not provided in a portion of the area of the reflecting surface 40*a*, the horizontally long light distribution pattern P substantially having four chipped corners may be formed as a bright light distribution pattern.

In the exemplary embodiment described above, it has been described that the light emitting element 30 is disposed such that the light emitting surface 30*a* faces downwards, and the reflector 40 is disposed below the light emitting element 30. However, another structure in which the light emitting element 30 is disposed such that the light emitting surface 30*a* faces upwards or sideways, and the reflector 40 is disposed at a location facing the light emitting element 30 may be employed.

In the exemplary embodiment described above, it has been described that the support member 50 has a structure in which a printed circuit board is formed on the surface of a platy resin member. However, a metal member such as an aluminum plate, instead of the resin member, may be used, and a flexible printed circuit board, instead of the printed circuit board, may be used.

In the exemplary embodiment described above, it has been described that the vehicle lamp 10 is a rear fog lamp arranged at the left rear end of a vehicle, but may be configured as a rear fog lamp arranged at the right rear end of a vehicle or another type of lamp (e.g., a clearance lamp, a daytime running lamp, a tail lamp, or a stop lamp). Here, the emission color of the light emitting element 30 may be, for example, white or amber depending on, for example, the type of the lamp.

In the exemplary embodiment described above, it has been described that the vehicle lamp 10 has a structure in which three lamp units 20A, 20B, and 20C are provided within a lamp chamber formed by the lamp body 12 and the translucent cover 14. However, when the vehicle lamp 10 is, for example, a clearance lamp or a daytime running lamp, a structure in which three lamp units 20A, 20B, and 20C are provided within a lamp chamber formed by a translucent cover and a lamp body of a head lamp may be employed.

Hereinafter, various modified examples of the reflecting surface 40*a* of the reflector 40 according to the exemplary embodiment described above will be described.

Figure 7C:
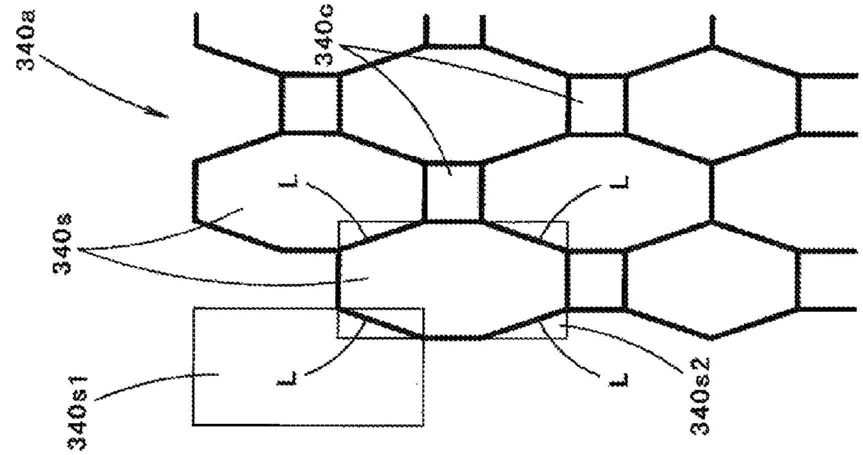
FIGS. 7A to 7C are views illustrating first to third modified examples of the exemplary embodiment, which correspond to FIG. 5A.
Figure 7B:
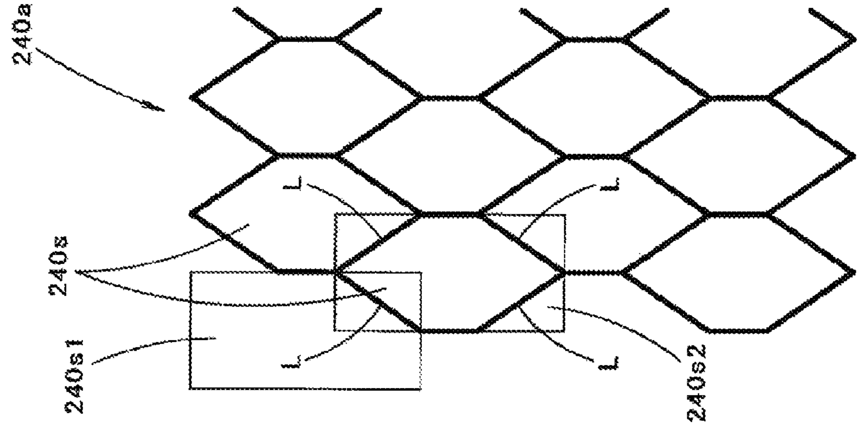
Figure 7A:
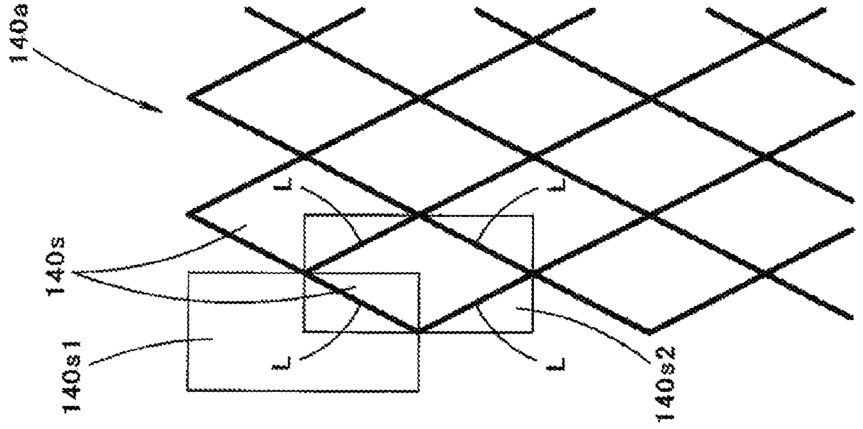

FIG. 7A is a view illustrating a reflecting surface 140*a* according to a first modified example, which corresponds to FIG. 5A.

A plurality of reflecting elements 140*s* that constitute the reflecting surface 140*a* are formed by superposition of a plurality of reflecting elements 140*s*1, and a plurality of reflecting elements 140*s*2. The outer shape of each of these reflecting elements 140*s*1 and 140*s*2 is the same as each of the reflecting elements 40*s*1 and 40*s*2 of the above-described exemplary embodiment, but the aspect of the overlapping is different from that in the above-described exemplary embodiment.

That is, in the present modified example, each of the reflecting elements 140*s*2 and each of the reflecting elements 140*s*1 are arranged to be shifted from each other by a half pitch in the left-and-right direction as well as in the up-and-down direction. Accordingly, each reflecting element 140*s*, in a front view of the lamp, has a vertically long rhombic outer shape (i.e., an outer shape obtained by omitting four corners of each reflecting element 140*s*2) surrounded by four boundary lines L extending from a vertical plane in inclined directions in the left-and-right direction, as lines of intersection between each reflecting element 140*s*1 and each reflecting element 140*s*2.

Also, in the present modified example, the surface of each reflecting element 140*s* is composed of a curved surface which has a curvature of a horizontal section larger than a curvature of a vertical section. Accordingly, in the present modified example, the horizontally long light distribution pattern P having four chipped corners may be formed as a bright light distribution pattern.

FIG. 7B is a view illustrating a reflecting surface 240*a* according to a second modified example, which corresponds to FIG. 5A.

A plurality of reflecting elements 240*s* that constitute the reflecting surface 240*a* are formed by superposition of a plurality of reflecting elements 240*s*1, and a plurality of reflecting elements 240*s*2. The outer shape of each of these reflecting elements 240*s*1 and 240*s*2 is the same as each of the reflecting elements 40*s*1 and 40*s*2 of the above-described exemplary embodiment, but the aspect of the overlapping is different from that in the above-described exemplary embodiment.

That is, in the present modified example, each of the reflecting elements 240*s*1 and each of the reflecting elements 240*s*2 are arranged to be shifted from each other by a half pitch in the left-and-right direction, and overlap with each other by about ⅓ in the up-and-down direction. Accordingly, each reflecting element 240*s*, in a front view of the lamp, has a vertically long hexagonal outer shape (i.e., an outer shape obtained by omitting four corners of each reflecting element 240*s*2) surrounded by four boundary lines L extending from a vertical plane in inclined directions in the left-and-right direction, as lines of intersection between each reflecting element 240*s*1 and each reflecting element 240*s*2, and a pair of left and right sides.

Also, in the present modified example, the surface of each reflecting element 240*s* is composed of a curved surface which has a curvature of a horizontal section larger than a curvature of a vertical section. Accordingly, in the present modified example, the horizontally long light distribution pattern P having four chipped corners may be formed as a bright light distribution pattern.

FIG. 7C is a view illustrating a reflecting surface 340*a* according to a third modified example, which corresponds to FIG. 5A.

A plurality of reflecting elements 340*s* that constitute the reflecting surface 340*a* are formed by superposition of a plurality of reflecting elements 340*s*1, and a plurality of reflecting elements 340*s*2. The outer shape of each of these reflecting elements 340*s*1 and 340*s*2 is the same as each of the reflecting elements 40*s*1 and 40*s*2 of the above-described exemplary embodiment, but the aspect of the overlapping is different from that in the above-described exemplary embodiment.

That is, in the present modified example, each of the reflecting elements 340*s*1 and each of the reflecting elements 340*s*2 are arranged to overlap with each other by about ¼ in the left-and-right direction, and about ⅓ of the up-and-down direction. Accordingly, each reflecting element 340*s*, in a front view of the lamp, has a vertically long octagonal outer shape (i.e., an outer shape obtained by omitting four corners of each reflecting element 340*s*2) surrounded by four boundary lines L extending from a vertical plane in inclined directions in the left-and-right direction, as lines of intersection between each reflecting element 340*s*1 and each reflecting element 340*s*2, a pair of upper and lower sides and a pair of left and right sides.

Also, in the present modified example, the surface of each reflecting element 340*s* is composed of a curved surface which has a curvature of a horizontal section larger than a curvature of a vertical section. Accordingly, in the present modified example, the horizontally long light distribution pattern P having four chipped corners may be formed as a bright light distribution pattern.

Also, when the structure of the reflecting surface 340*a* as in the present modified example is employed, rectangular minute reflecting areas 340*c*, each of which is surrounded by a pair of reflecting elements 340*s*2 adjacent thereto in the up-and-down direction and a pair of reflecting elements 340*s*1 adjacent thereto in the left-and-right direction, are formed at a plurality of locations.

On each minute reflecting area 340*c*, the surface shape may be properly set. Here, when the surface shape of each minute reflecting area 340*c* is set as a shape in a state of a rotary paraboloid face Pr, the central light intensity of the horizontally long light distribution pattern P may be increased. When the surface shape is set as a convex curved shape or a concave curved shape which is different from a rotary paraboloid face Pr, the total brightness of the horizontally long light distribution pattern P may be increased.

Figure 8C:
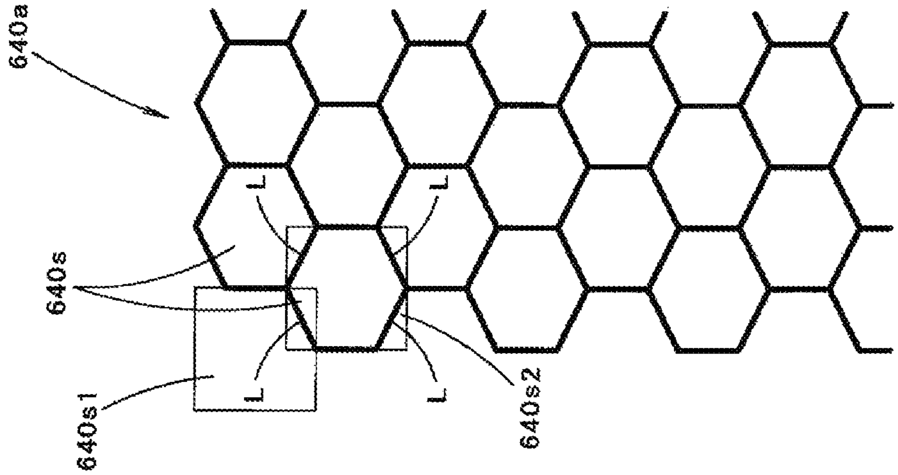
FIGS. 8A to 8C are views illustrating fourth to sixth modified examples of the exemplary embodiment, which correspond to FIG. 5A.
Figure 8B:
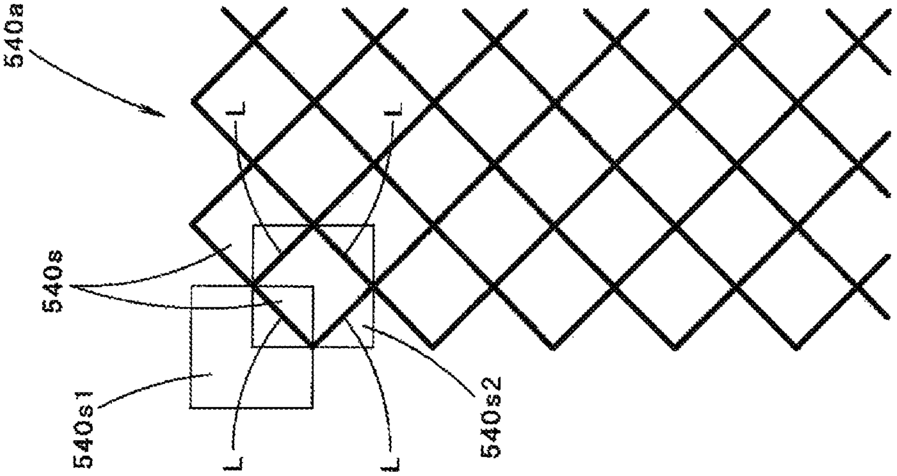
Figure 8A:
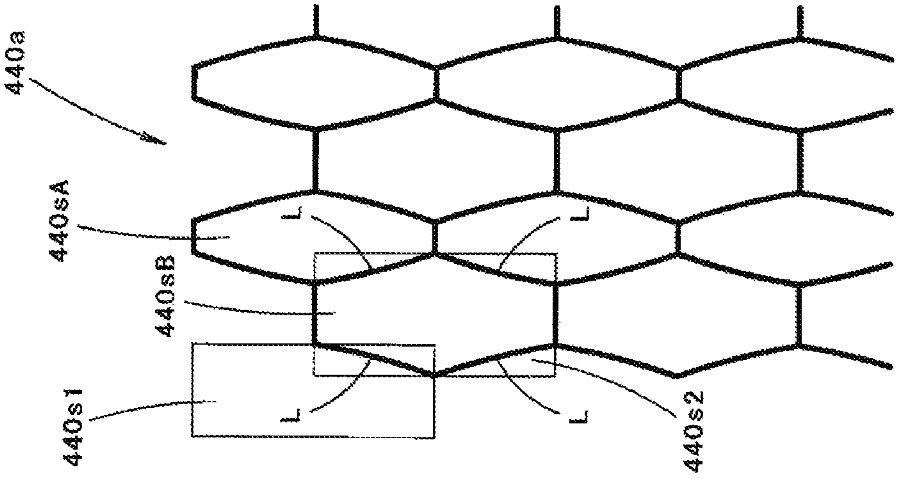

FIG. 8A is a view illustrating a reflecting surface 440*a* according to a fourth modified example, which corresponds to FIG. 5A.

A plurality of reflecting elements 440*s*A and 440*s*B that constitute the reflecting surface 440*a* are formed by superposition of a plurality of reflecting elements 440*s*1, and a plurality of reflecting elements 440*s*2. The outer shape of each of the reflecting elements 440*s*2 is the same as each of the reflecting elements 40*s*2 of the above-described exemplary embodiment, but the outer shape of each of the reflecting elements 440*s*1 is slightly smaller in a left-and-right width as compared to each of the reflecting elements 40*s*1 of the above-described exemplary embodiment.

Also, in the present modified example, the surface of each of the reflecting elements 440*s*A and 440*s*B is composed of a curved surface which has a curvature of a horizontal section larger than a curvature of a vertical section. Each reflecting element 440*s*1 having a smaller left-and-right width is set to have a larger curvature value of a horizontal section as compared to each reflecting element 440*s*2 having a larger left-and-right width, so that lights reflecting from the respective reflecting elements 440*s*A and 440*s*B have substantially the same left-and-right diffusion angle values.

In the present modified example, each of the reflecting elements 440*s*1 and each of the reflecting elements 440*s*2 are arranged to be shifted from each other by a half pitch in the up-and-down direction, and overlap with each other by about ¼ to ⅓ in the left-and-right direction. Accordingly, in the case of each of the reflecting elements 440*s*A and 440*s*B, in a front view of the lamp, has a substantially vertically long hexagonal outer shape (i.e., an outer shape obtained by omitting four corners of each reflecting element 440*s*1 (440*s*2)) surrounded by four boundary lines L extending from a vertical plane in inclined directions in the left-and-right direction, as lines of intersection between each reflecting element 440*s*1 and each reflecting element 440*s*2, and a pair of upper and lower sides.

Meanwhile, each boundary line L is formed to extend a curved shape in a front view of the lamp. This is because the respective reflecting elements 440*s*A and 440*s*B are different in the curvature of the horizontal section. Thus, each reflecting element 440*s*A with an outer shape obtained by omitting four corners of each reflecting element 440*s*1 has a substantially vertically long hexagonal outer shape in which a portion of each of the boundary lines L is swelled, and each reflecting element 440*s*B with an outer shape obtained by omitting four corners of each reflecting element 440*s*2 has a substantially vertically long hexagonal outer shape in which a portion of each of the boundary lines L is recessed.

Also in the case where the structure of the present modified example is employed, the horizontally long light distribution pattern P having four chipped corners may be formed as a bright light distribution pattern.

FIG. 8B is a view illustrating a reflecting surface 540*a* according to a fifth modified example, which corresponds to FIG. 5A.

A plurality of reflecting elements 540*s* that constitute the reflecting surface 540*a* are formed by superposition of a plurality of reflecting elements 540*s*1, and a plurality of reflecting elements 540*s*2. The respective reflecting elements 540*s*1 and 540*s*2 have square outer shapes and are formed in the same sizes.

Then, in the present modified example, each of the reflecting elements 540*s*1 and each of the reflecting elements 540*s*2 are arranged to be shifted from each other by a half pitch in the left-and-right direction as well as in the up-and-down direction. Accordingly, in the case of each reflecting element 540*s*, in a front view of the lamp, has a rhombic outer shape (i.e., an outer shape obtained by omitting four corners of each reflecting element 540*s*2) surrounded by four boundary lines L extending from a vertical plane in inclined directions in the left-and-right direction, as lines of intersection between each reflecting element 540*s*1 and each reflecting element 540*s*2.

Also, in the present modified example, the surface of each reflecting element 540*s* is composed of a curved surface which has a curvature of a horizontal section larger than a curvature of a vertical section. Accordingly, in the present modified example, the horizontally long light distribution pattern P having four chipped corners may be formed as a bright light distribution pattern.

FIG. 8C is a view illustrating a reflecting surface 640*a* according to a sixth modified example, which corresponds to FIG. 5A.

A plurality of reflecting elements 640*s* that constitute the reflecting surface 640*a* are formed by superposition of a plurality of reflecting elements 640*s*1, and a plurality of reflecting elements 640*s*2. The respective reflecting elements 640*s*1 and 640*s*2 have square outer shapes and are formed in the same sizes.

Then, in the present modified example, each of the reflecting elements 640*s*1 and each of the reflecting elements 640*s*2 are arranged to be shifted from each other by a half pitch in the left-and-right direction, and overlap with each other by about ¼ in the up-and-down direction. Accordingly, in the case of each reflecting element 640*s*, in a front view of the lamp, has a hexagonal outer shape (i.e., an outer shape obtained by omitting four corners of each reflecting element 640*s*2) surrounded by four boundary lines L extending from a vertical plane in inclined directions in the left-and-right direction, as lines of intersection between each reflecting element 640*s*1 and each reflecting element 640*s*2, and a pair of left and right sides.

Also, in the present modified example, the surface of each reflecting element 640*s* is composed of a curved surface which has a curvature of a horizontal section larger than a curvature of a vertical section. Accordingly, in the present modified example, the horizontally long light distribution pattern P having four chipped corners may be formed as a bright light distribution pattern.

Numerical values indicated as specifications in the embodiment and its modified examples are illustrative only, and may be appropriately set as other values as a matter of course.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicle lamp comprising:

a plurality of lamp units each being displaced backward of a vehicle as it goes in an outside in a width direction of the vehicle, each of the plurality of lamp units comprising:

a light emitting element; and a reflector configured to reflect light from the light emitting element forward, wherein a reflecting surface of the reflector has a structure in which a plurality of reflecting elements are arranged in rows in an up-and-down direction, and the plurality of reflecting elements arranged in rows are arranged as a plurality of sets in a left-and-right direction, the plurality of reflecting elements are arranged to be shifted from each other in the up-and-down direction in adjacent respective sets, each of the reflecting elements is connected to at least one reflecting element which is adjacent thereto in the left-and-right direction and is shifted therefrom in the up-and-down direction, through a boundary line extending from a vertical plane in an inclined direction in the left-and-right direction, a surface of each of the reflecting elements is composed of a curved surface which has a curvature of a horizontal section larger than a curvature of a vertical section, and a plurality of diffusion reflecting elements extending in a front-and-rear direction of the vehicle are provided to be aligned in an up-and-down direction on a surface of a right wall of the reflector that is formed with a step when view from a rear side of the vehicle.

2. The vehicle lamp of claim 1, wherein the plurality of reflecting elements are arranged to be shifted from each other by a half pitch in one of the up-and-down direction and the left-and-right direction, or both directions in the respective sets.

3. The vehicle lamp of claim 1, wherein each of the reflecting elements has an outer shape having a greater up-and-down width than a left-and-right width.

4. The vehicle lamp of claim 1, wherein the reflector is disposed below the light emitting element, and the light emitting element is disposed such that a light emitting surface of the light emitting element faces downwards.

5. The vehicle lamp of claim 1, wherein a plurality of sets of light emitting elements and reflectors are arranged.

6. The vehicle lamp of claim 2, wherein the plurality of reflecting elements are arranged to be shifted from each other by a half pitch in the left-and-right direction while overlapping with each other by about ⅓ in the up-and-down direction.

7. The vehicle lamp of claim 2, wherein the plurality of reflecting elements are arranged to overlap with each other by about ¼ in the left-and-right direction while overlapping with each other by about ⅓ in the up-and-down direction.

8. The vehicle lamp of claim 2, wherein the plurality of reflecting elements are shifted from each other by a half pitch in the up-and-down direction while overlapping with each other about ¼ to ⅓ in the left-and-right direction.

9. The vehicle lamp of claim 2, wherein the plurality of reflecting elements are shifted from each other by a half pitch in the left-and-right direction while overlapping with each other about ¼ in the up-and-down direction.

10. The vehicle lamp of claim 1, wherein each of the plurality of lamp units is configured as a reflector unit including the light emitting element and the reflector, and is supported by a common support member.

* * * * *